United States Patent [19]

Hunt

[11] Patent Number: 4,998,851
[45] Date of Patent: Mar. 12, 1991

[54] VIBRATION DAMPENED BORING BAR

[75] Inventor: Carl E. Hunt, Davisburg, Mich.

[73] Assignee: GTE Valenite Corporation, Troy, Mich.

[21] Appl. No.: 370,137

[22] Filed: Jun. 22, 1989

Related U.S. Application Data

[63] Continuation-in-part of Ser. No. 132,086, Dec. 11, 1987, abandoned.

[51] Int. Cl.$^5$ .................................................. B23B 27/00
[52] U.S. Cl. ...................................... 408/143; 188/268; 279/8; 408/144; 408/233; 408/239 R
[58] Field of Search ................. 188/268, 378; 408/143, 408/144, 199, 238, 239 R, 239 A, 713, 233; 279/1 A, 8

[56] References Cited

U.S. PATENT DOCUMENTS

| | | | |
|---|---|---|---|
| 1,360,016 | 11/1920 | Porter | 407/54 |
| 2,640,378 | 6/1953 | Haggar | 408/226 |
| 3,164,041 | 1/1965 | Carlstedt | 408/713 |
| 3,178,969 | 4/1965 | Yogus et al. | 408/154 |
| 3,238,600 | 3/1966 | Milewski | 408/226 |
| 3,375,741 | 4/1968 | Guglielmetti | 408/199 |
| 3,447,402 | 6/1969 | Ray | 408/143 |
| 3,599,996 | 8/1971 | Holt | 279/1 B |
| 3,699,843 | 10/1972 | Sweeny | 408/226 |
| 3,820,422 | 6/1974 | Rivin | 82/36 |
| 3,923,414 | 12/1975 | Hopkins | 408/143 |
| 3,938,626 | 2/1976 | Hopkins | 188/1 |
| 4,167,218 | 9/1979 | Horiuchi et al. | 173/163 |
| 4,604,010 | 8/1986 | Reeves | 409/233 |
| 4,622,871 | 11/1986 | Van Sickle et al. | 82/1.2 |
| 4,632,614 | 12/1986 | Rall | 29/12 |
| 4,655,655 | 4/1987 | Shurfeld | 409/232 |

FOREIGN PATENT DOCUMENTS 3237128   4/1984   Fed. Rep. of Germany ... 408/239 R

OTHER PUBLICATIONS

"A Chatter-Resistant Cantilever Boring Bar" by Eugene I. Rivin, Wayne State Univ.
"An Extra-Long Cantilever Boring Bar with Enhanced Chatter Resistance" by Eugene I. Rivin and Xiap-Zhong Wu, Wayne State Univ.

Primary Examiner—Daniel W. Howell
Attorney, Agent, or Firm—Robert E. Walter

[57] ABSTRACT

A boring bar has a longitudinal axis, with a steel head section having a cutting insert displaced from the longitudinal axis. In one embodiment, a cemented carbide section is joined directly thereto. In another embodiment, a intermediate section includes a devibrator body. The respective sections are joined by a centrally positioned drawbar threadedly inserted into the head section for maintaining a compressive force at the specifically configured connection between the axially aligned sections.

15 Claims, 3 Drawing Sheets

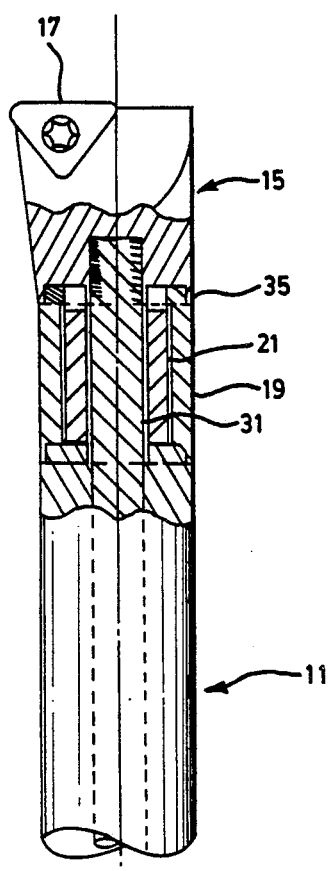
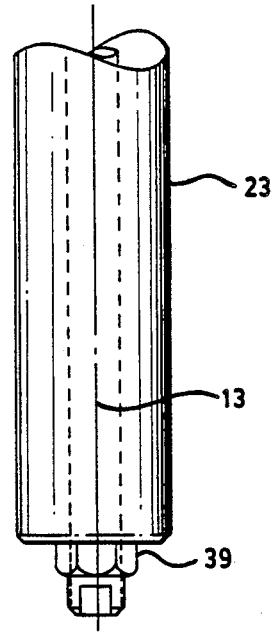
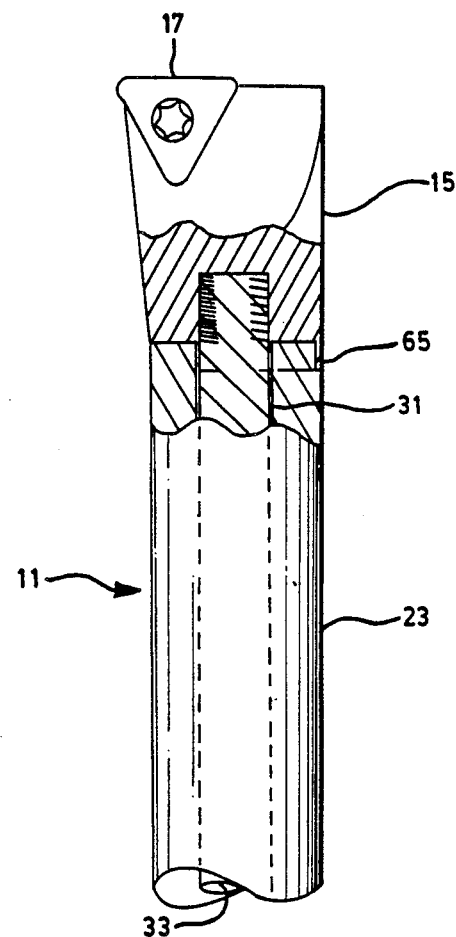
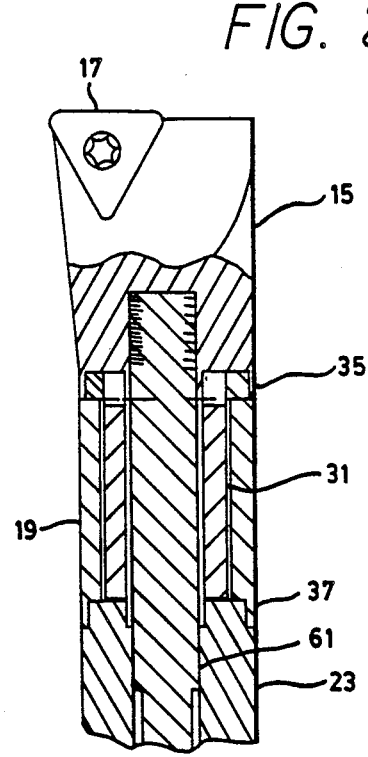
FIG. 1
FIG. 2
FIG. 3

VIBRATION DAMPENED BORING BAR

This is a continuation-in-part of copending application Ser. No. 07/132,086, filed on Dec. 11, 1987 now abandoned.

FIELD OF INVENTION

The present invention relates to boring tools, typically known as cantilever tools having a structure for dampening vibrations.

BACKGROUND OF THE INVENTION

Cantilever tools are characterized by the cutting instrument being spaced from the longitudinal axis so that forces generated during cutting tend to cantilever the boring bar in a direction perpendicular to axis. During either rotation of the tool or workpiece, the bending moment along the axis tends to displace the cutting tool in the radial direction, hence, making it difficult to perform accurate cutting.

In an article entitled "An Extra-Long Cantilever Boring Bar With Enhanced Chatter Resistance" by Rivin and Wu, Department of Mechanical Engineering, Wayne State University, Detroit, Michigan, prior art techniques for enhancing the chatter-resistance of cantilever tools are discussed. As set forth in line 15 of the introduction the article, "Both resonance frequencies and chatter resistance are correlated with the length (L) to diameter (D) ratio of the cantilever holders. All practitioners know that it is difficult to achieve stable cutting at overhang ratios exceeding L/D=4-5 [4-5:1]. While this ratio is not high, one has to remember that to machine (or inspect) a hole, the diameter D of the tool should be smaller than the hole diameter to accommodate cutting (or measuring) head, but the length L of the tool should be longer than the hole depth to eliminate danger of interference between the spindle holding the tool and the part being machined. In automated tool handling systems (machining centers, flexible manufacturing cells, etc.) the useful length of tools is further reduced by the need for special design features such as gripping surfaces for tool changers, surfaces for identification codes, etc.

As set forth, more stable chatter-resistant tools make possible deeper cuts, and thus fewer cuts, resulting in higher productivity. Chatter-resistant tools also combine better surface finish with more intensive machining regimes. They demonstrate slower wear of cutters due to reduced high-frequency vibration amplitudes, which may result in better cylindricity of machined surfaces.

The article describes the boring bar fabricated for the experiments carried out. The boring bar includes an aluminum end segment having an inside cavity for receiving dynamic vibration absorbers. A connecting lug threaded into the aluminum section joins a cemented carbide stiffener. The tool head is mounted on the aluminum segment and includes a cutting insert displaced from the axis of rotation.

In an attempt to place a highly elastic material near the cutting insert, the boring bar of Rivin utilizes an aluminum section. For long life, it has been found that aluminum does not have the requisite structural integrity and can be easily damaged during multiple cutting operations. Such damage to the aluminum section can result in a wearing away of the aluminum thus creating an imbalanced tool. Aluminum does not have the requisite properties to hold the head on the bar with threading or to hold the insert in the pocket. Thus, frequent replacement of the aluminum head is necessitated.

In another article entitled "A Chatter-Resistant Cantilever Boring Bar" by Rivin, the stability of various boring bars was examined. The results of tests show that the tungsten alloy and aluminum bar incorporating dynamic vibration absorbers performed better than a solid steel bar, a solid steel bar with dampening vibration absorbers, a solid bar of machinable tungsten alloy, or composite bar without the dampening vibration absorbers. The article concludes that the use of composite cantilevered structure having a root portion of high-modulus materials with an overhand portion of low-density materials improves dynamic characteristics, especially if dynamic vibration absorbers are employed.

U.S. Pat. No. 3,820,422 to Rivin relates to a composite cantilevered tool mandrel having two portions with the portion adjacent the tool having a modulus of elasticity of at least 1.5 times higher than that of the other portion. Further, the head portion has a material density of at least 1.5 times lower than the rear portion. As set forth, the combination of materials for the portions include steel plus aluminum or titanium alloy, tool hardened alloy plus steel, or molybdenum plus aluminum. As set forth, the natural elastic properties of the materials are utilized with the bar portion near the cutting tool being highly elastic and less dense than the driving portion of the bar which is rigid. As set forth in the patent, the connection between the two sections is made by a thread type or interference connection. The vibration shock absorber utilized in the head portion is a solid cylindrical slug.

Thus, Riven concentrates on a boring bar where a low density and highly elastic head portion is confined with a high density and extremely rigid portion. U.S. Pat. No. 3,923,414 to Hopkins relates to a vibration dampening support for a boring bar utilizing multiple parallel bores and a plurality of inertia mass members positioned in the respective bores with a slight circumferential clearance. The mass members are free to move transversely to the shank axis within the circumferential clearance provided.

U.S. Pat. No. 3,938,626 to Hopkins relates to a vibration dampening construction for a cutter head having a rigidly anchored cantilever internal bar extending rearwardly within a cylindrical cavity. A optional number of heavy reactors are assembled on the cantilevered bar to give a reactive oscillator dampening effect.

The present invention concerns the production of an optimized boring bar constructed of materials which contribute to prolong tool life and are structurally combined in such a manner so as to give enhanced performance.

SUMMARY OF THE INVENTION

It is an object of the present invention to provide a boring bar utilizing a combination of different materials having an improved connection therebetween.

It is an object of the present invention to increase the stiffness of the joint at the transition of the different materials being utilized.

It is an object of the present invention to provide a boring bar with increased rigidity at the head section while having enhanced vibration resistance.

It is an object of the present invention to provide for a selection of materials in combination with a joint configuration which results in minimizing the transition of the flexure characteristics along the axial length of the boring bar.

It is a further object of the present invention to select materials which provide prolonged life and enhanced vibration resistance for a cantilevered tool.

It is an object of the present invention to provide for a higher natural frequency of oscillations by improving the joint between the different materials and the overall construction of the boring bar.

It is a further object of the present invention to provide a boring bar in which damaged parts can be readily disassembled and replaced.

It is also an object of the present invention permitting the use of the bar/nose combination can be used with or without the intermediate devibrator section.

Additional and further objects of the present invention will become apparent from reading the following description of the present invention.

In accordance with the present invention, there is provided a boring bar having a central longitudinal axis and comprising a steel head section adapted to receive a cutting insert, a hollow cylindrically shaped cemented carbide section, and a hollow cylindrically shaped intermediate steel section. A drawbar which is connected between the head section and the cemented carbide section holds these sections in axial alignment along the central axis. It is also contemplated that the connections are configured in such a manner that the cemented carbide section may be joined directly to the steel head portion. The drawbar, which is under tension, holds the intermediate section and the respective joints between sections under compression for increasing the stiffness of the tool at the joints.

The drawbar includes an exterior precision surface for slidably contacting the interior hollow portion of the cemented carbide section for centering the drawbar relative to the rearward section for preventing relative radial movement between the forward portion of the drawbar and the rearward cemented carbide section.

When an intermediate section is utilized, the tool is provided with at least one annular ring for dampening the vibration. The annular ring is positioned radially intermediate the drawbar and the inside surface of the bore in the intermediate section. The annular ring is positioned axially intermediate the head section and the carbide section. The intermediate section forms a first connection with the head section and a second connection with the cemented carbide section.

When an intermediate section is not utilized, the cemented carbide section forms a connection with the head section. In either case, i.e., with or without the intermediate section, each connection comprises a key and a keyway and additionally a pair of first and second surfaces. The first surfaces and second surfaces respectively, extend on either side of the respective key or keyway and lie substantially within a plane perpendicular to the axis of rotation. The first surfaces are adapted to mate with the second surfaces for maintained axial alignment of the respective sections and along the axis of rotation and increasing the stiffness of the joint.

The connection has a specific configuration adapted for joining the hollow cemented carbide section and the steel head section. In addition to comprising a drawbar for holding the respective sections under compression for increasing the stiffness of the tool at the joints, the connection includes a key and a keyway and an additional pair of mating surfaces as set forth above. Preferably, the first and second surfaces of the respective head portion or the cemented carbide section comprise a major portion of the cross-sectional area of the respective section.

BRIEF DESCRIPTION OF THE DRAWINGS

FIG. 1 is a side view of the boring bar showing a portion in section.

FIG. 2 is a side elevational view showing the joint between the head portion and cemented carbide portion in section.

FIG. 3 is a side elevational view showing the connections between the intermediate section and the respective head portion and cemented carbide section of FIG. 1 in an enlarged view.

DESCRIPTION OF PREFERRED EMBODIMENT

Figures 7, 8, 9:
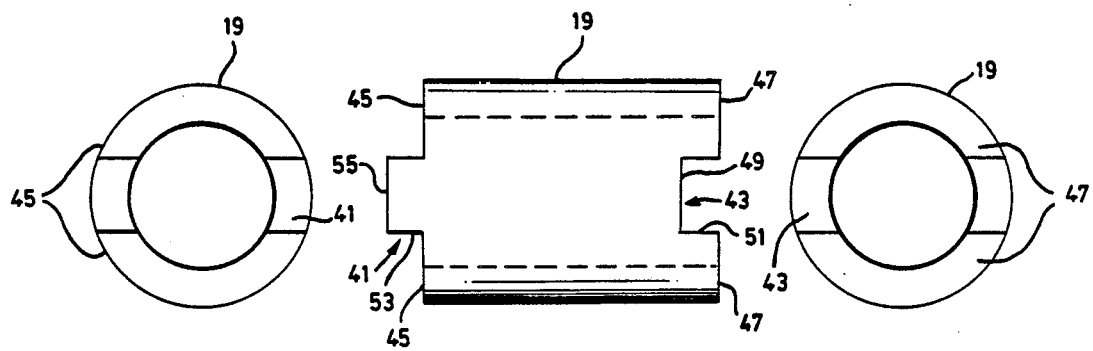
FIG. 7 is a side elevational view of the devibrator body.
FIG. 8 is an end elevational view of the devibrator body.
FIG. 9 is a rear elevational view of the devibrator body.

The embodiment of this invention as set forth in the drawings is particularly suited for achieving the objects of this invention. FIG. 1 depicts a cylindrically shaped boring bar having a central longitudinal axis. If the boring bar 11 is rotated so to cut the work, the longitudinal axis 13 is parallel to or coincides with the axis of rotation. In case the work is turned to form a cylindrical bore, the longitudinal axis 13 is parallel to or coincides with the central axis of the bore being cut. A forwardly projecting head section 15 is adapted to receive a cutting insert 17 and be driven into the work being cut for boring purposes. An intermediate section 19 formed of a steel material includes a dynamic devibrator 21 for controlling vibration and improving cutting performance. The rearward section 23 is a cemented tungsten carbide body which may have a longitudinally extending flat section 25 on the outer periphery for engaging a drive mechanism to cause the boring bar 11 to rotate. In the case where the workpiece is turned and the boring bar 11 remains stationary, the flat section 25 permits holding the boring bar 11 in the proper position.

Figures 4, 6:
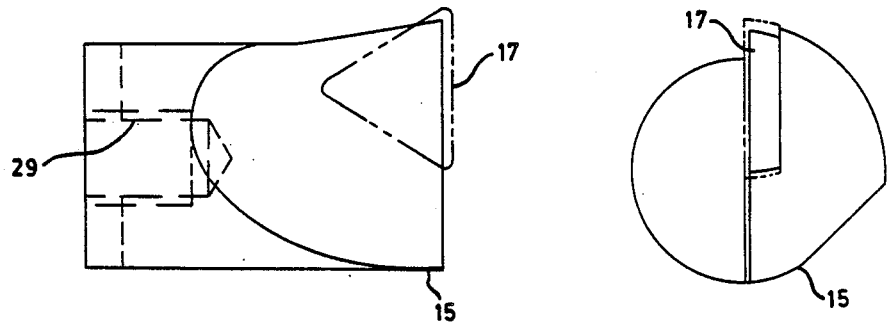
FIG. 4 is a side elevational view of the head portion.
FIG. 6 is an end elevational view of the head portion shown in FIG. 4.
Figure 5:
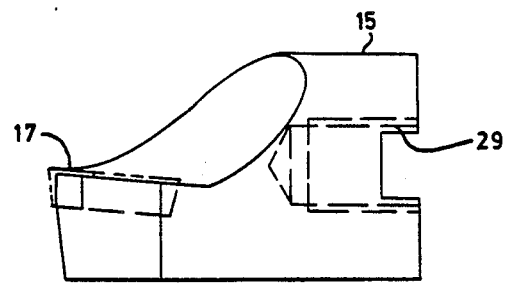
FIG. 5 is a top elevational view of the head section showing FIG. 4.
Figure 10:
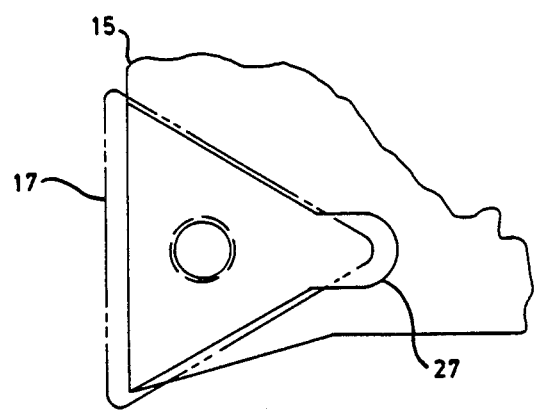
FIG. 10 is an enlarged view of a portion of the head portion shown in FIG. 4 including the cutting insert

As illustrated in FIGS. 4, 5 and 6, the configuration of the head portion 15 is shown. The forwardly projecting head section 15 is preferably made of a steel material. A cutting insert 17 of the indexable type is mounted in a pocket 27 at the forward end of the head section 15. The detailed mounting is shown in FIG. 10. The insert 17 has a cutting edge displaced from the longitudinal axis 13 resulting in the cantilever tool of the type in which tool chatter is desirably controlled. The pocket 27 is mounted on a cutaway section of the cylindrical head section 15 so that the cutting edge of the insert 17 is adapted to extend axially forward of the head portion 15 and radially beyond the peripheral surface of the cylindrically shaped boring bar 11. As shown in FIGS.

5 and 4, the head section 15 includes a centrally located and axially aligned threaded bore 29 receiving a drawbar 31.

As shown in the enlarged cross-sectional view of FIG. 3, the rearward end of the head section 15 is connected to a hollow cylindrically shaped intermediate section 19. The intermediate section 19 is preferably made of steel material. The interior hollow portion of intermediate section 19 is a cylindrical recess having a diameter greater than the outer diameter of the devibrator 21. The devibrator 21, which is shown in detail in FIGS. 1 to 3, is in the form of an annular ring and is positioned axially intermediate the head portion 15 and the rearward cemented carbide section 23. The radial position of the devibrator 21 is intermediate the outer surface of the draw bar 31 and the interior surface of the intermediate section 19 which corresponds to the interior surface of the cylindrical recess or bore.

The devibrator 21 is mounted with slight axial clearance to assure freedom of radial movement. Although one annular ring is shown in the drawings as a damping device, it is contemplated that a plurality of rings may be utilized. When multiple rings are utilized, the rings may be provided with successive varying clearances between the respective outer diameters and the interior wall of the intermediate section 19. It is contemplated that various arrangements may be utilized to effectively oppose and dampen vibrations created during cutting. The devibrator 21 is preferably made of a heavy impact resistant material such as tungsten in a copper matrix or other heavy metal.

Figure 11:
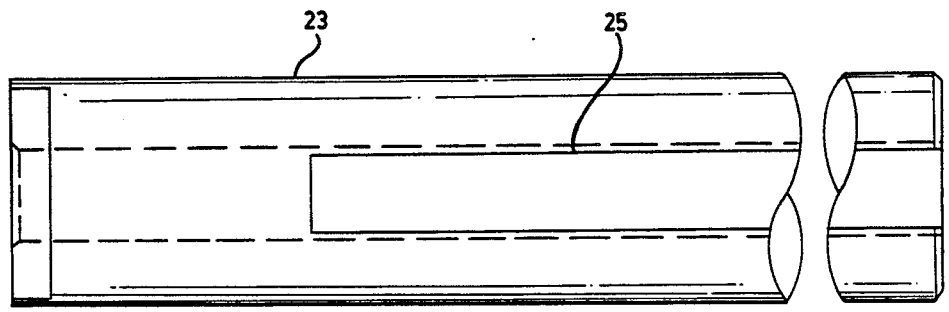
FIG. 11 is a side elevational view of the cemented carbide section.
Figure 12:
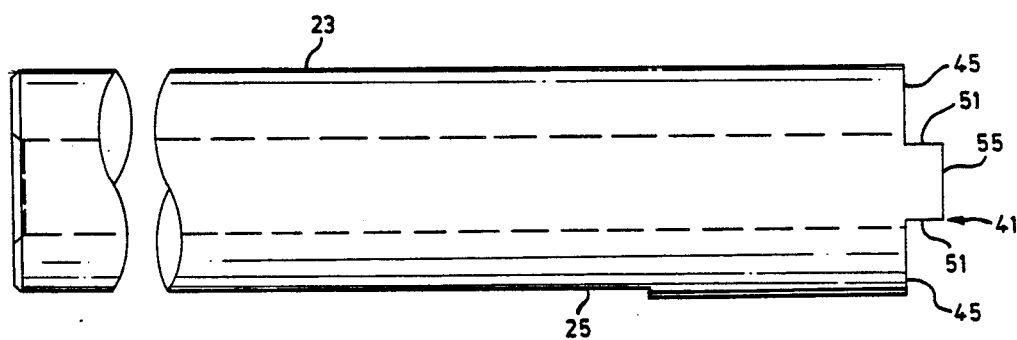
FIG. 12 is a top elevational view of the cemented carbide section shown in FIG. 11.

As shown in FIG. 3, the rearward end of the intermediate section 19 is connected to the cemented carbide section 23. The cemented carbide section 23 may be made by extruding a hollow cylindrical bar comprising a mixture of refractory metal carbide and metal binder material with an organic binder. The section 23 may also be machined by techniques known in the art. The extruded bar is sintered under conditions known in the art to obtain the final cemented carbide. Preferably, tungsten carbide is utilized as the refractory metal carbide with cobalt the metal binder. It is contemplated that the cemented carbide will include additional refractory metal carbides, such as molybdenum carbide and other binder ingredients to enhance the desirable material properties of the intermediate section. Such desirable properties include stiffness, high density, and dimensional accuracy As shown in FIGS. 11 and 12 and in accordance with the principles of the present invention, it has been found that the combination of a rearward section 23 of sintered cemented carbide having a density of 0.54 lb/in$^3$ and an elastic modulus of 94 million psi and a steel head portion and intermediate section is preferred. The interior opening 33 of the cemented carbide rearward section 33 is a cylindrical recess having an interior surface spaced a sufficient distance from the longitudinal axis 13 so that the drawbar 31 can be inserted into the interior opening 33 without interference.

Also, in accordance with the principles of the present invention, the intermediate section 19 forms a connection 35 with the head portion 15 and another rearward section which provides a stiff juncture between the sections 15, 19, 23 and provides minimal flexure between different materials being utilized.

Referring to FIG. 1, the intermediate section 19 includes complementary mating connections 35 and 37 with the head portion 15 and rearward section 23, respectively. The respective sections 15, 19, 23 are held in axial alignment by the abutment of the respective end portions of each of the sections 15, 19, 23. The sections 15, 19, 23 are held in compression by a drawbar 31. The drawbar 31 has one end in engagement with the rearward section 23 the other end in threading engagement with the head portion 15. The drawbar 31 extends entirely through the intermediate section 19 and is preferably attached at the end of the rearward section 23 by a nut 39 secured to a threaded end of the draw bar 31.

The drawbar 31 is placed under tension by turning the nut 39 to increase tension on the drawbar 31 and place an increased compressive force on the sections 15, 19, 23. The drawbar 31, as illustrated in FIG. 2, is cylindrically shaped and threaded at each end. The diameter is less than the interior cylindrical recess so as to permit the drawbar 31 to be easily inserted into the cylindrical recess. By tightly drawing the drawbar 31 into tension, the flexure at the respective connections 35, 37 can be reduced and the stiffness of the connections enhanced.

Also in accordance with the principles of the present invention, the respective connections 35, 37 have a preferred geometrical configuration for enhancing the stiffness at the juncture of the sections 15, 19, 23. The combination of utilizing a drawbar 31 and specific configuration geometry is an important feature of the present invention.

As shown in detail in FIG. 3, the intermediate section 19 forms complimentary connections 35, 37 with each connection of the connections 35, 37 comprising a key 41 and a keyway 43. A pair of first surfaces 45 are associated with the key 41 and a pair of second surfaces 47 are associated with the keyway 43. A complementary key 41 and keyway 43 are respectfully shown in FIGS. 12 and 7. A similar numerical designation is used for the key and keyways depicted in the drawings even though they may form a portion of the same part and not be complementary and mating. The first surfaces 45 mate with the second surfaces 47 to provide for utilization of a large cross-sectional area of the respective sections 15, 19, 23 for bearing the compressive force between the sections and maintaining axial alignment. Preferably, the respective surfaces 45, 47 of the respective head portion 15 and the cemented carbide section 23 comprise a major portion of the cross-sectional area of the respective section 25, 23. The first and second surfaces 45, 47 extend on either side of the respective key 41 or keyway 43 and lie substantially within a plane perpendicular to the longitudinal axis 13 of the boring bar 11.

As shown in FIG. 1, the keyway 43 comprises a transversely extending slot having a rectangular cross-section. The transverse axis of the slot is in alignment with a diameter passing through the axis of the boring bar 11. A keyway detail is shown in FIG. 7. The keyway associated with the head section 15 at connection 35 is similarly configured. The keyway 43 has a flat bottom wall 49 with planar side walls 51 extending outwardly therefrom. Each of the respective side walls 51 join a respective one of the second surfaces 47. Each of the second surfaces 47 extend laterally outwardly from the keyway 43.

FIG. 12 and FIG. 7 show details of the configuration of key 41 and complementary keyway 43, respectively. The key 41 has a configuration matching the keyway 43. Sides 53 extend diametrically across and project outwardly from the end of a respective section The sides 53 are joined by planar top wall 55 which matches the bottom wall 49. When the key 41 is inserted into the complementary keyway 43, the sides 53 of the key 41 are closely adjacent the sidewalls 51 of the keyway 43, so that torque from turning the boring bar 11 is transmitted from one section to the other. The close fit between the key 41 and keyway 43 aids in obtaining the proper axial alignment between respective sections 15, 19, 23. The top wall 55 of the key 41 is preferably spaced from the bottom wall 49 of the keyway 43, so that the compressive forces are borne by the first and second surfaces.

As shown in the partial sectional view of FIG. 3, the drawbar 31 has an enlarged end portion 61 closely adjacent the intermediate section 9. The partial section of FIG. 3 shows the enlarged end portion 61 and its relationship with the cylindrical recess of the rearward section 23 as exaggerated to shown the details of a sliding precision fit between the drawbar 31 and the rearward section 23. The drawbar 31 is thusly provided with a means for centering the drawbar 31 relative to the rearward section 23 to prevent relative radial movement between an end of the drawbar 31 and the rearward section 23. The drawbar 31 and the interior hollow portion of the rearward section 25 have precision mating surfaces. According to a most preferred sliding precision fit, the tolerance of the inside diameter of the rearward section 23 is held at a total tolerance of less than ten thousandths of an inch, and preferably at a total tolerance of less than five ten thousandths of an inch. The drawbar 31 which is of a steel construction is also held to a similar total tolerance. The above description of the sliding precision fit is not intended to limit the present invention since it is believed that greater tolerances may result in a sliding precision fit in accordance with the present invention.

Also, according to a preferred embodiment of the present invention, the enlarged portion 61 extends rearwardly along the axial direction form the junction of the rearward section 23 a distance sufficient to impart enhanced stiffness to the tool 11. To a certain extent, the preferred rearward extent of the enlarged portion 61 depends on the diameter of the drawbar 31 and the diameter of the cylindrical recess in the rearward section 23 with larger diameters requiring a greater rearward extension of the enlarged portion 61 to result in a proportionally enhanced stiffening effect. Preferably the enlarged portion 61 extends rearwardly a distance along the axis of the drawbar 31 a distance of from about one to about four diameters. The diameter can be either the inside diameter of the cylindrical recess or the outside diameter of the drawbar 31 since both are essentially identical in the area of the sliding precision fit.

In an embodiment as shown in FIG. 2, the respective first surfaces 42 and respective second surfaces 47 comprise a major portion of the cross-sectional area of the boring bar. The connection between the head section 15 and cemented carbide section 23 is shown at 65. The relatively large cross-sectional area of the surfaces 45 and 47 of the respective head section 15 and cemented carbide section 23 are in direct mating relationship and bear the compressive force created by the drawbar. Thus, a structure of increased rigidity is provided due to the use of a drawbar and large area of the mating surfaces.

I claim:

1. A boring bar having a longitudinal axis comprising a head section adapted to receiving a cutting insert,
    a hollow cylindrically shaped cemented carbide section,
    a cylindrically shaped intermediate section having an interior hollow portion, said intermediate section positioned intermediate said head section and said cemented carbide section,
    a first connection formed at the juncture of said intermediate section and said head section,
    a second connection formed at the juncture of said intermediate section and said cemented carbide section,
    a drawbar connected between said head portion and said cemented carbide section for holding said sections in axial alignment along said axis, said drawbar being under tension for holding said intermediate section and said first and said second connections under a compressive force,
    said drawbar and said cemented carbide section being provided with mating precision surfaces for centering said drawbar relative to the rearward section for preventing relative radial movement between the forward end of said drawbar and said cemented carbide section,
    at least one annular ring for dampening vibrations positioned in said hollow portion and positioned axially intermediate said head section and said carbide section,
    each of said first and said second connection comprising a key and a keyway and a pair of first and second surfaces,
    said first surfaces and said second surfaces, respectfully, extending on either side of said respective key and said keyway substantially within a plane perpendicular to said axis of rotation, and
    said first surfaces being adapted to meet the said second surfaces to align said head section, said intermediate section, and said cemented carbide section along said longitudinal axis.

2. A boring bar according to claim 1 wherein said head portion includes a pocket for receiving said insert, and said insert is indexably mounted in said pocket.

3. A boring bar according to claim 1 wherein said annular ring comprises a heavy impact resistant material.

4. A boring bar according to claim 1 wherein said drawbar is threadedly inserted into said head portion.

5. A boring bar according to claim 2 wherein said drawbar includes a nut for securing said drawbar to the rearward section.

6. A boring bar according to claim 1 wherein said cross-sectional area of said respective surfaces comprise about a major portion of the cross-sectional area of said head section and said intermediate section.

7. A boring bar having a longitudinal axis comprising a head portion adapted to receive a cutting insert and a hollow cylindrically shaped cemented carbide section,
    a connection being formed at the juncture of said head section and said cemented carbide section,
    a drawbar connected between said head portion and said cemented carbide section for holding said sections in axial alignment along the longitudinal axis and holding said connection under compression for increasing the stiffness of the tool,
    said drawbar and said cemented carbide section being provided with mating precision surfaces for centering said drawbar relative to the rearward section for preventing relative radial movement between the forward end of said drawbar and said cemented carbide section, said connection comprising a transversely positioned key on one of said sections and a transversely positioned keyway being provided on said other of said sections, said connection including a pair of first and second surfaces, said first surfaces and said second surfaces, respectively, extending on either side of said respective key and said keyway substantially within a plane perpendicular to said axis of rotation, said first surfaces being adapted to mate with said second surfaces to align said head portion and said cemented carbide section along the longitudinal axis, and said first surfaces and said second surfaces, respectively comprising a major portion of the cross-sectional area of said boring bar.

8. A boring bar according to claim 7 wherein said head portion includes a pocket for receiving said insert, and said insert is indexably mounted in said pocket.

9. A boring bar according to claim 8 wherein said drawbar includes a nut for securing said drawbar to the rearward section.

10. An elongated grooving or threading tool according to claim 1 wherein said mating precision surfaces comprises providing said drawbar with an enlarged end portion closely adjacent the cutting section, said enlarged portion being adapted for providing a sliding precision fit between the drawbar and the rearward section within said hollow rearward section for preventing relative radial movement between the forward end of said drawbar and the rearward section.

11. An elongated grooving or threading tool according to claim 10 wherein said enlarged portion extends rearwardly along the axial direction from the junction of the rearward section a distance sufficient to impart enhanced stiffness to the tool.

12. An elongated grooving or threading tool according to claim 11 wherein said enlarged portion extends rearwardly a distance of from about one to about four diameters wherein said diameter corresponds to the diameter of said enlarged portion at said sliding precision fit.

13. An elongated grooving or threading tool according to claim 7 wherein said mating precision surfaces comprises providing said drawbar with an enlarged end portion closely adjacent the cutting section, said enlarged portion being adapted for providing a sliding precision fit between the drawbar and the rearward section within said hollow rearward section for preventing relative radial movement between the forward end of said drawbar and the rearward section 14. An elongated grooving or threading tool according to claim 13 wherein said enlarged portion extends rearwardly along the axial direction from the junction of the rearward section a distance sufficient to impart enhanced stiffness to the tool.

15. An elongated grooving or threading tool according to claim 14 wherein said enlarged portion extends rearwardly a distance of from about one to about four diameters wherein said diameter corresponds to the diameter of said enlarged portion at said sliding precision fit.

* * * * *